(No Model.)

T. A. WATROUS.
GRIDDLE.

No. 591,513. Patented Oct. 12, 1897.

Witnesses
H. H. Mills
A. S. Diven

Inventor
Thomas A. Watrous
by Eugene Diven
Attorney

THE NORRIS PETERS CO., PHOTO-LITHO., WASHINGTON, D. C.

UNITED STATES PATENT OFFICE.

THOMAS A. WATROUS, OF ELMIRA, NEW YORK, ASSIGNOR OF ONE-HALF TO ASA W. LA FRANCE, OF SAME PLACE.

GRIDDLE.

SPECIFICATION forming part of Letters Patent No. 591,513, dated October 12, 1897.

Application filed December 15, 1896. Serial No. 615,723. (No model.)

*To all whom it may concern:*

Be it known that I, THOMAS A. WATROUS, a citizen of the United States, residing at Elmira, in the county of Chemung and State of New York, have invented certain new and useful Improvements in Griddles, of which the following is a specification.

My invention relates to improvements in griddles in which a peripheral flange is made to raise the bottom of the griddle above the top of the stove, thereby forming a hot-air chamber between the griddle and the stove, said chamber being larger in area than the baking-surface of the griddle. As now made these griddles when placed upon a stove form with the top thereof a closed-in chamber, from which there can be no free escape of the inclosed air. After it becomes heated this air is held in tension and in a completely dead condition. This dead air is a bad conductor of heat and it requires quite a hot fire to heat the griddle properly. Moreover, if one portion of the stove is hotter than another that portion of the griddle over this hotter portion of the stove will also be hotter than the rest of the griddle. I have found that these griddles give better satisfaction when used on an old stove whose top has become more or less warped, the unevenness of the top causing air-vents beneath the edge of the peripheral flange which allow the pent-up air to escape from the chamber, thus relieving the air of its dead condition and inducing air-currents beneath the bottom of the griddle which carry the heat from the top of the stove to all parts of said bottom, searching out the coolest parts and heating all alike.

One object of my improvements, therefore, is to provide properly-arranged vents for this hot-air chamber, so as to give life and consequent motion to the confined air and cause the induced air-currents to carry the heat from the stove to all parts of the baking-surface of the griddle with equal intensity.

Another object of my improvements is to provide the griddle with a central handle by which it may be lifted without fear of its tilting from the horizontal, and by which it may be readily turned about while on the stove and more easily and handily manipulated while in the act of baking cakes.

I attain these objects by the construction illustrated in the accompanying drawings, in which—

Figure 1:
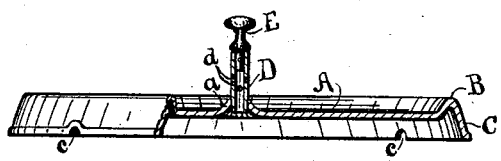
Figure 2:
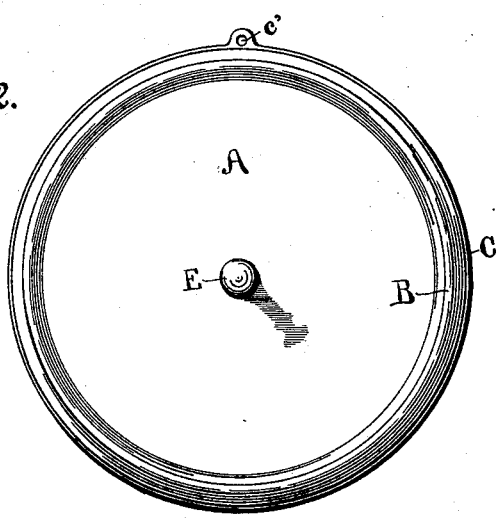
Figure 5:
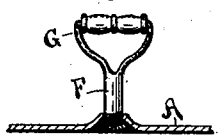
Figure 4:
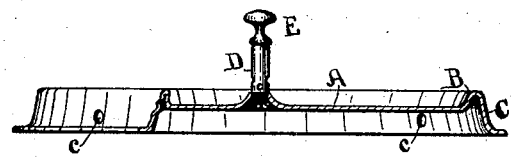
Figure 3:
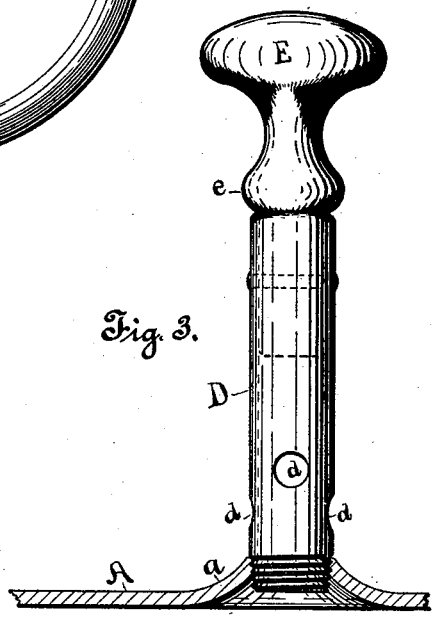

Figure 1 is an elevation, partly in section, of a cast-iron griddle provided with my improvements; Fig. 2, a plan view of the same; Fig. 3, a detail showing the handle and central vent enlarged; Fig. 4, a view similar to that in Fig. 1, showing my improvements as adapted to a griddle struck up from sheet metal; and Fig. 5, a modified form of handle.

Similar letters refer to similar parts throughout the several views.

The bottom A of the griddle has a raised rim B, extending all around its outer periphery, from which depends a flange C, which extends a suitable distance below the bottom A to raise it from the stove and produce the hot-air chamber. At the center of the bottom A is a hole provided with a turned-up lip *a*, threaded to receive the tubular stem D, which is provided with the vent-holes *d* and has attached to its top the wooden or other non-conductive handle E. Around the flange C are disposed a number of small openings *c*.

When the griddles are made of cast-iron, the openings *c* are formed, when casting, by arranging the mold so as to produce them around the bottom edge of the flange, as shown in Fig. 1. When struck up from sheet metal, these holes are drilled or punched in the peripheral flange after the griddle has been formed, as it would be expensive to make dies to produce the openings as in Fig. 1. These holes are not very large and are not so numerous as to allow too free an escape of the air or gases from the hot-air chamber. Four holes at quarter-distances around the flange produce very good results. The holes may also be located anywhere on the flange from its crown to its base, and I do not limit myself to the localities shown. It is important, however, that the holes shall be spaced at three or more equidistant points around the flange in order that the vents may affect all parts of the griddle equally, an object which would not be attained were the unevenness of a stove-top to be depended upon alone to supply the air-vents, as it is evident that in such a case only one point on one side of the griddle might be vented, with a strong probability of no vent at all.

For the purpose of hanging up the griddle when not in use I provide an enlargement at one point on the peripheral flange with a hole $c'$ to receive a nail or hook.

The lip $a$ is formed as shown more clearly in Fig. 3, being curved up from the bottom of the griddle and afterward tapped out to receive the threads of the stem D. The inside of the lip allows a sufficient number of threads to be cut therein to hold the stem. This turned-up lip serves several purposes. It prevents the batter from running in against the stem, its inner periphery presents more surface for cutting the threads than if the metal was not struck up, and, as it is designed to remove the handles and nest the griddles together when shipping in bulk, the lip of one griddle will fit up into that of the next and allow them to be packed tightly together. A central boss may be formed on the cast griddles and afterward drilled and tapped, but it will prevent close nesting unless recessed beneath.

The handle E is riveted into the top of the stem D, as indicated in Fig. 3, and is provided with a bulge at $e$, which prevents the fingers from coming in contact with the hot metal of the stem.

As already stated, I have found in using the old form of griddle that the best results were obtained with it when used on the warped top of an old stove, where the edge of the flange could not set down closely all around, as on the level top of a comparatively new stove, the reason being that there was an escape for the pent-up air beneath the flange, and consequently a better conduction of heat to the bottom of the griddle. I have also discovered that by providing a central vent the surface of the griddle is much more evenly heated and the cakes will be browned to the same degree at the center of the griddle as at its periphery. These peripheral vents in conjunction with the central vent induce into the air-chamber currents of hot air from the top of the stove, which cause an even and rapid distribution of the heat from the stove to the baking-surface of the griddle. Cakes baked on a griddle of this construction are evenly and well browned all over with the use of a much more moderate fire than is required with a griddle having the dead-air space, and equally good results are to be obtained whether the stove be old or new.

The central handle allows the cakes to be spread, turned, and removed from the griddle with great facility, as any portion of the griddle may be quickly brought within reach by a twist of the wrist and there is no obstacle to interfere, as when a bail is used. This upright central handle is also always in position to be grasped without fear of burning the hand, as is often done when picking up a bail from the edge of a griddle Other forms of handles may be used without departing from the spirit of my invention—as, for instance, that illustrated in Fig. 5, in which a tubular stem F is split and forked at the top to form with a wooden cross-bar a so-called "spade-handle" G, the tubular stem portion forming the central vent.

The handles are preferably made removable in order to facilitate shipping the griddles, the griddles being nested and crated compactly together and the handles being strung on a cord or packed in a separate box. When the griddles are placed in use in the kitchen, however, the handles are to be fastened securely in place and to remain there permanently.

What I claim as my invention, and desire to secure by Letters Patent, is—

1. A griddle provided with a depending flange, in combination with a central tubular venting-stem capped with a handhold, whereby the griddle may be lifted and manipulated substantially as described.

2. A griddle provided with a depending flange having air-inlet openings, in combination with a tubular venting-stem adapted to be screwed or otherwise fastened in an opening at the center of the griddle, said stem having a non-conductive handle at its top, substantially as described.

In testimony whereof I have affixed my signature in presence of two witnesses.

THOMAS A. WATROUS.

Witnesses:
H. H. MILLS,
A. S. DIVEN.